Nov. 16, 1965  J. A. RUBICO ETAL  3,217,579
DIES FOR CUTTING CROSS-LINKED RAND INSOLES
Filed Feb. 4, 1964  2 Sheets-Sheet 1

INVENTORS:
CHARLES F. BATCHELDER
JEROME A. RUBICO
BY

Russell, Chittick + Pfund
ATTORNEYS

Nov. 16, 1965    J. A. RUBICO ETAL    3,217,579
DIES FOR CUTTING CROSS-LINKED RAND INSOLES
Filed Feb. 4, 1964
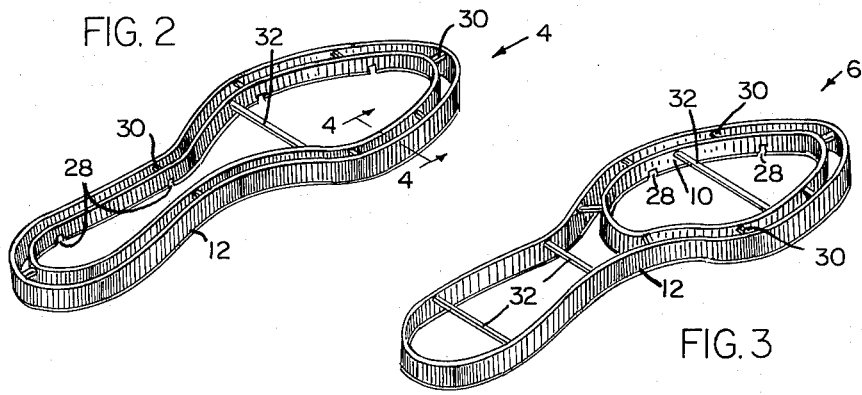
FIG. 2
FIG. 3
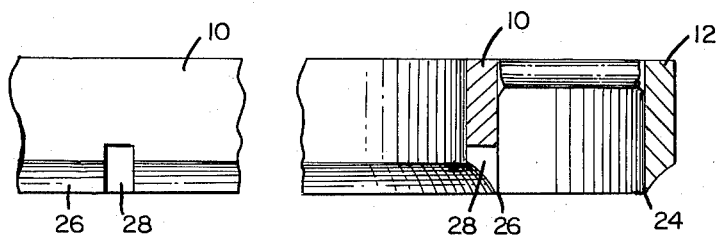
FIG. 4
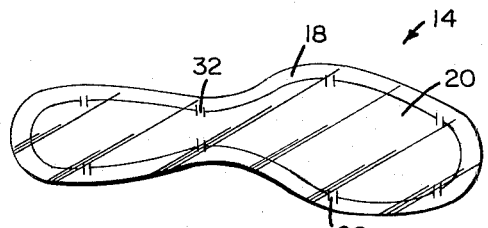
FIG. 5
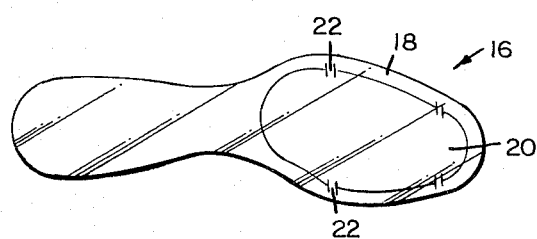
FIG. 6
INVENTORS:
CHARLES F. BATCHELDER
JEROME A. RUBICO
BY
Russell, Chittick, & Pfund
ATTORNEYS

United States Patent Office 3,217,579
Patented Nov. 16, 1965

3,217,579
DIES FOR CUTTING CROSS-LINKED
RAND INSOLES
Jerome A. Rubico, Boston, and Charles F. Batchelder,
Milton, Mass., assignors to Batchelder-Rubico, Inc.,
Boston, Mass., a corporation of Massachusetts
Filed Feb. 4, 1964, Ser. No. 342,411
8 Claims. (Cl. 83—652)

This invention relates to shoemaking dies and more particularly to dies for cutting cross-linked rand insoles.

In our prior and copending application, Serial No. 310,029, filed September 19, 1963, we described a novel cross-linked rand insole shoe construction. The term "cross-linked rand insole" referred to an insole which was cut out in a conventional shape and additionally cut or slit inwardly of its periphery so as to separate the insole into two portions, one constituting a rand extending substantially around at least the forward portion of the shoe and a central or core portion extending across the entire area within the rand. The rand, however, was not entirely severed from the core portion, but was maintained cross-linked thereto by small ties or links spaced around the insole.

The initial cutting of the cross-linked rand insole to the size and pattern to the conventional insole can be performed by either of the two methods of insole cutting currently employed in the shoemaking industry, that is, by die cutting sheet stock material in a suitable insole cutting machine or by rounding insole blanks on a planet rounder. In either case, however, once the insole has been shaped to the proper size and pattern, the insole must also be cut or slit inwardly of its periphery to form the above-mentioned components of the cross-linked rand insole. The slits which define the interior peripheral contour of the cross-linked rand insole must be accurately positioned in the insole in order to avoid distorting the structural relationship of the rand, core portion and cross links and consequently negating the inherent advantages of the cross-linked rand insole construction. Although the slitting of the cross-linked rand insole can be performed by a skilled cutter using a suitable cutting instrument, such as, a knife or wheel cutter, the essentially manual nature of this operation leaves much to be desired in terms of the accuracy, uniformity and speed required for an efficient shoemaking process.

It is accordingly an object of the present invention to provide a die for cutting cross-linked insoles. In the accomplishment of this object, we construct a die which has a cutting blade shaped to conform to the interior periphery of the cross-linked rand insole. The cutting blade has a discontinuous or interrupted cutting surface, i.e., a number of spaced notches formed therein which correspond in width and location to the desired cross links of the cross-linked rand insole. Thus, when the die is pressed into the insole, either by hand dinking or machine "clicking," the portions of the insole beneath the cutting surfaces of the blade are cut to form slits having the desired contours and dimensions while the portions of the insole which underlie the notched areas of the cutting blade remain uncut thereby producing the requisite cross links.

It is a feature of our novel die that the die can be employed with insoles rounded from insole blocks on a planet rounder as well as with insoles formed by die cutting on a suitable insole cutting machine or "clicker." If the insoles are shaped to the proper size and pattern by rounding on a planet rounder, the process of forming the cross-linked rand insole requires two separate operations, i.e., the insole is first rounded on a planet rounder and then slit to form the component parts of the cross-linked rand insole. Unfortunately, this procedure introduces another operation in the shoemaking process. However, if the insole is die cut on a "clicking" machine, it is possible to eliminate the separate operation of insole slitting by employing a double die arrangement in which both the outer periphery of the cross-linked rand insole and the inner periphery or slits are cut with a single stroke of the "clicker" arm.

It is accordingly another object of the present invention to provide an alternate embodiment of the die for simultaneously cutting both the interior and exterior peripheries of the cross-linked rand insole. In the accomplishment of this object we construct a "clicking" die which has two cutting blades, one, an inner cutting blade and the other, an outer cutting blade, separated from each other by a predetermined distance and shaped to conform, respectively, to the interior and exterior peripheral contours of the cross-linked rand insole. The outer cutting blade has a conventional continuous cutting edge whereas the inner cutting blade has a discontinuous or interrupted cutting surface, i.e., a number of spaced notches formed therein which correspond in width and location to the desired cross links of the cross-linked rand insole. Thus, when the double bladed die is pressed into the insole base material, the outer cutting blade cuts the exterior periphery of the cross-linked rand insole while at the same time the inner cutting blade cuts the interior slits thereby forming the rand, core portion and cross links of the cross-linked rand insole with a single stroke of the "clicker" arm.

It is a feature of our double bladed die that two or more cross-linked rand insoles can be cut from a stack of insole stock material with one stroke of the "clicker" arm without accumulating unwanted pieces of cut insole material within the area described by the double bladed die.

These and other objects and features of the invention will best be understood from a more detailed description of the preferred embodiments thereof selected for purposes of illustration, and shown in the accompanying drawings in which:

FIG. 2 is a perspective view of a double bladed cross-linked rand insole die;

FIG. 3 is a perspective view of a modified double bladed cross-linked rand insole die;

FIG. 4 is a cross-sectional view taken along lines 4—4 of FIG. 2 showing the double cutting blades of one embodiment of the cross-linked rand insole die;

FIG. 5 is a plan view of a cross-linked rand insole cut by the die shown in FIG. 2;

FIG. 6 is a plan view of a cross-linked rand insole cut by the die shown in FIG. 3; and, FIG. 7 is a plan view of a cross-linked rand insole showing the preferred location of the cross links.

Figure 1:
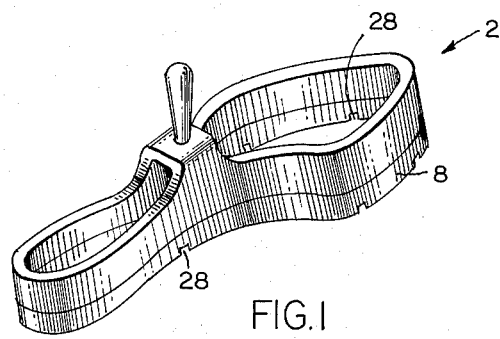
FIG. 1 is a perspective view of a single bladed cross-linked rand insole die constructed in accordance with the present invention.

Referring now to the drawings, FIGS. 1, 2 and 3 depict in perspective three of the preferred embodiments of our cross-linked rand insole die, indicated generally as 2, 4 and 6, respectively. It can be seen from an inspection and comparison of the above-mentioned figures that the cross-linked rand insole die 2 is a single bladed die having one cutting blade 8 whereas both of the dies 4 and 6 are double bladed with each die having an inner cutting blade 10 and an outer cutting blade 12. The cutting blades 8, 10 and 12 are formed from strip steel of a suitable thickness and shaped to the exact pattern of the desired cross-linked rand insole. The die blade 8 is constructed from heavier strip steel than the steel used in blades 10 and 12 because the die 2 is used for hand dinking insoles and consequently must withstand the pressures and unequal stresses produced by hammering on the die handle. On the other hand, dies 4 and 6 would normally be used in a "clicker" machine which imposes an equal pressure on the entire upper surface of the die.

Referring to FIGS. 2 and 3, it can be seen that the inner and outer blades 10 and 12 of dies 4 and 6 are separated from each other by a predetermined distance established by the particular configuration of the cross-linked rand insole. The separation distance between the inner cutting blade 10 and the outer cutting blade 12 is not necessarily uniform and will vary in accordance with the structural patterns of the desired cross-linked rand insole.

The structural patterns of the preferred embodiments of our cross-linked rand insoles were described in detail in our copending application, Serial No. 310,029, filed September 19, 1963, however, in order to better illustrate the relationship between the cross-linked rand insole and the corresponding insole die, we have reproduced in FIGS. 5 and 6 of the present application, two of the embodiments of the cross-linked rand insole depicted in our copending application. The two embodiments, indicated generally as 14 and 16 in FIGS. 5 and 6, respectively, each have an outer rand portion 18, an inner central core portion 20 and a plurality of ties or cross-links 22 between the two portions of the insole. Although the same structural components are employed in both embodiments of the cross-linked rand insole, the patterns of the individual components as well as the number, width and spacing of the cross links 22 will vary from insole to insole depending upon the ultimate application of the cross-linked rand insole in the shoemaking process. Thus, for example, if the cross-linked rand insole is employed in making women's high heel shoes, the insole preferably should have a relatively small central core 20 in the forepart of the insole and a solid heel-seat as shown in FIG. 6. However, if the insole is used for men's dress or work shoes, the insole pattern shown in FIG. 5 is more appropriate.

While the number spacing and width of the cross links 22 may vary as mentioned above and illustrated in the two embodiments 14 and 16, the function of the cross links 22 during the lasting process is identical for all embodiments of the cross-linked rand insole. During the lasting process the cross links or ties 22 maintain the rand 18 and core portion 20 of the insole in cross-linked relation so that the insole can be handled by the operator as though it were a full and solid insole yet without sacrificing the advantages of the skeletal rand insole construction disclosed in another of our copending applications, Serial No. 278,568, filed May 7, 1963. In that application we described a novel skeletal rand insole construction which differed from a conevntional insole in that the skeletal rand occupied only the outer marginal area of the insole. This type of insole construction produced an extremely light and flexible and therefore comfortable shoe because the outsole was the only element other than the sock lining between the foot of the wearer and the bottom of the shoe in the central portion thereof.

The skeletal rand insole while producing an extremely comfortable shoe, also created handling problems during the leasting process because of its inherent flexibility and open structure. These problems were described in the above-mentioned copending application, Serial No. 310,029 and reference is made thereto. It is sufficient for the purposes of the instant application to state that the cross-linked rand insole eliminated the inherent handling problems of the skeletal rand insole by utilizing an essentially solid insole during the lasting process. Instead of lasting the upper to the limp and flexible rand portion of the skeletal rand insole, the upper is lasted to the relatively firm and rigid cross-linked rand insole along the lasting margin thereof. After the upper is lasted to the rand portion 18 of the cross-linked rand insole, the central core portion 20 is removed from the lasted insole by rupturing or severing the cross links 22. The core removal can be performed either prior to or subsequent to sole laying depending upon the type of shoe and the particular operational sequence desired by the shoe manufacturer.

From this brief description of the structure and function of the various components of the cross-linked rand insole, it will be readily apparent that the cross-linked rand insole dies 4 and 6 can best be defined in terms of their corresponding cross-linked rand insoles 14 and 16, respectively. The single bladed die 2 will not be treated separately in the following discussion since the size and pattern of the blade 8 is identical with that of the inner blade 10 for a given insole configuration. If FIGS. 1 and 5 and FIGS. 2 and 6 are viewed together as pairs, it can be seen that the outer cutting blades 12 on insole dies 4 and 6 each have a single cutting edge 24 which follows the contour of the exterior periphery of the corresponding cross-linked rand insoles 14 and 16, respectively. The inner cutting blades 10 also have a single cutting edge 26, however, the cutting edge 26 conforms to the inner peripheral contour of the corresponding insoles 14 and 16, respectively. It should be noted that since both the inner cutting blade 10 and the outer cutting blade 12 are formed from relatively thin strip steel, they too will conform to the contours of the inner and outer peripheries, respectively, of the cross-linked rand insole.

The inner and outer cutting blades 10 and 12, respectively, are shown in greater detail in FIG. 4 wherein the cutting edges 24 and 26 are depicted with one surface thereof hollow ground. This is merely illustrative of one possible cutting edge configuration and is not intended to limit the scope of the invention.

The inner cutting blade 10 has a number of notches 28 formed therein at spaced intervals along the cutting edge 26. The width of the notches 28 is determined by and, equal to, the desired width of the cross links 22 on the corresponding cross-linked rand insole The depth of the notches 28 is governed by the thickness of the insole base material and must be at least equal to the thickness of the heaviest contemplated insole base material. If more than one insole is cut from insole base material without removing the previously cut insole from the die, as would be the case either with a single stroke cut of stacked insole material or multiple cuts made in a single sheet of insole material, then the depth of the notches 28 must be sufficient to accommodate the total thickness of the cut insoles.

The notches 28, as shown in FIGS. 1, 2, 3 and 4 each have a perfect rectilinear shape, however, this particular shape is not required to produce the desired cross links 22. In actual practice, the notches can be formed with a grinding wheel and therefore will have slightly filleted interior corners. The notches 28 can of course have other shapes depending upon the desired cross-sectional profile of the cross links 22. For example, if in a particular application of the cross-linked rand insole, the cross links 22 must be relatively frangible, then a generally triangular shaped cross-sectional profile is more suitable than the rectangular profile depicted in the drawings and, hence, the notches 28 would be wedge shaped.

Although the previous discussion has referred to the inner cutting blade 10 and the outer cutting blade 12 as each having a single cutting edge, i.e., 26 and 24, respectively, both blades can be made double-edged with duplicate notches 28 formed in the two cutting edges, of the inner cutting blade 10. It should be noted, however, that since the cross-linked rand insole of our co-pending application, Serial No. 310,029, would normally be covered with a sock lining in the finished shoe, the insole base material may be used either side up, and both lefts and rights may therefore be cut when a die having cutting edges on one side only.

It has already been pointed out that the inner cutting blade 10 and the outer cutting blade 12 are spaced apart by a distance determined by the pattern of the desired cross-linked rand insole. In the embodiment depicted in FIG. 2 the distance between the blades is uniform around the entire perimeter of the die 4. In contrast to the curvingly parallel blades of insole die 4, the inner and outer cutting blades of insole die 6 are parallel only for the portion of their total length which corresponds to the forepart of the cross-linked rand insole 16.

Although the spacing between the cutting blades will vary from one embodiment of the cross-linked rand insole die to another, for any given die the spaced relationship between the blades must be fixed and remain constant during use. Each die is therefore provided with several cross-membranes 30 which are welded in place between the inner and outer cutting blades 10 and 12, respectively. In addition one or more cross-braces 32 may be secured to opposing faces of the inner cutting blade 10 and in the embodiment depicted in FIG. 3, cross-braces 32 are also secured to the opposing faces of the outer cutting blade 12 in the shank and heel portion thereof.

It has already been mentioned that inaccurate placement of the cross links can distort the structural relationship of the rand and core portions of the insole during the lasting operation and, hence, negate the inherent advantages of the cross-linked rand insole construction. One of the features of our invention is that it permits an engineering design, incorporated in the die, to replace the judgment of many inidividual cutters as to the location and width of the cross links 22 between the rand and core portions 18 and 20, respectively, of the cross-linked rand insole.

Figure 7:
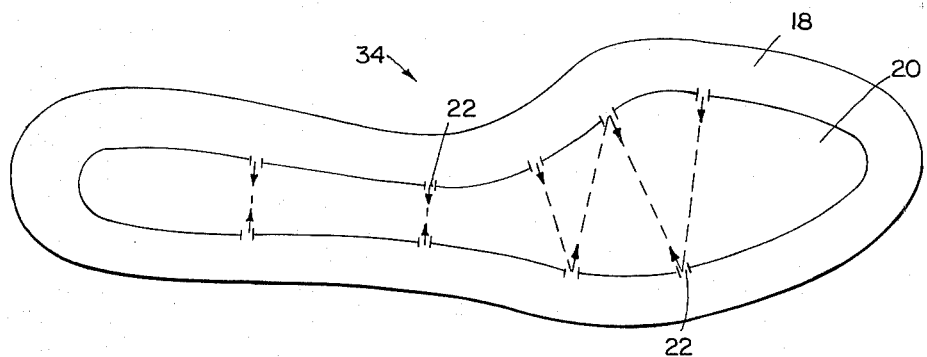

FIG. 7 depicts a preferred arrangement of the cross links 22 for the particular insole configuration shown therein and indicated generally as 34. The location of the cross links 22 around the inner periphery or perimeter of the core portion 20 is determined by the forces imposed upon the rand insole during the lasting process. Lasting operations, especially the staple side lasting of Goodyear welt shoes, subject the rand to an outward tension which exists until the forces are relieved by sole laying or by the drying and "setting" of the upper. Since the tension comes from the upper and its lining which are pulled over the edge of the bottom of the last, the forces are essentially normal to the outer peripheral edge of the rand and the pull is greatest in the ball and shank areas.

The tensile forces must be held by the rand portion 18 which is in turn supported by its interior core 20. The core 20 transmits the forces across the bottom of the last (not shown) to the opposite side of the rand and into the last by means of the lasting tacks used to secure the core 20 to the last. At the toe and heel the outward tensile forces are transformed by the catenary action of the semicircular rand in these areas into self-cancelling longitudinal forces in the side stretches of the rand.

However, at the ball and shank areas the outward tensile forces on the rand 18 must be supported from the core 20 by tension through the cross links 22. Since the forces carried through the cross links 22 are in tension, it is advantageous to have each such force offset by a like and opposite tension from a corresponding link on the opposite side of the insole element. This apposition of the cross links 22 becomes more important as the thickness of the insole material is decreased. As the greatest tensile pull on the rand is in the ball and shank areas, the cross-linked dies are accordingly notched in the corresponding portions thereof to provide for more cross links in these areas. FIG. 7 depicts such a controlled design of the location of the linkages, with five cross links in the ball area and four cross links in the shank portion of the cross-linked rand insole 34. The dotted lines indicate the counteracting tensile forces in the cross links 22 and the arrows show the direction of these forces. If a Goodyear welt is used, it is desirable to provide an extra pair of cross links in the shank area for increased support of the rand in that area. For cutting very light insoling material the width of notches 28 in the appropriate die may be increased at the areas of greatest stress, such as the break back of the inside ball, to increase the strength of the cross links in such areas.

It will now be apparent to those skilled in the art that the principles of cross link spacing and location enunciated above are equally applicable to the single bladed die construction as well as to the double bladed dies and that the control of the system of cross links, which is built into the cutting dies, is an important feature of the cross-linked rand insole construction.

Numerous other variations of our invention will now be readily apparent to thost skilled in the art and therefore it is not our intention to limit the same to the precise form of the embodiments shown herein, but rather to limit it in terms of the appended claims.

Having thus described and disclosed the preferred embodiments of our invention, what we claim as new and desire to secure by Letters Patent of the United States is:

1. A die for cutting cross-linked rand insoles comprising: a cutting blade having a cutting edge conforming to the contour of the inner periphery of a cross-linked rand insole, said cutting edge having at least three spaced notches therein.

2. The die described in claim 1 further characterized by said cutting edge having relatively long cutting segments separated from each other by relatively short notches.

3. A die for cutting cross-linked rand insoles comprising: an outer cutting blade having a cutting edge comforming to the contour of the exterior periphery of a cross-linked rand insole; an inner cutting blade having a cutting edge conforming to the contour of the inner periphery of said cross-linked rand insole, said inner blade cutting edge having at least three spaced notches therein; and means for maintaining said blades in spaced relationship.

4. The die described in claim 3 further characterized by said inner blade cutting edge having relatively long cutting segments separated from each other by relatively short notches.

5. A die for cutting cross-linked rand insoles comprising: a cutting blade having a cutting edge conforming to the contour of the inner periphery of a cross-linked rand insole, said cutting edge having at least three spaced notches positioned along the edge so that the line defined by each notch and another notch on the opposite side of the die will cross the cutting edge substantially normal to its peripheral line at one of said notches.

6. The die described in claim 5 further characterized by having at least three notches located in the ball portion of said die, a pair of notches in the shank portion of said die and a pair of notches in the heel portion of said die.

7. A die for cutting cross-linked rand insoles comprising: an outer cutting blade having a cutting edge conforming to the contour of the exterior periphery of a cross-linked rand insole; an inner cutting blade having a cutting edge conforming to the contour of the inner periphery of said cross-linked rand insole, said inner blade cutting edge having at least three spaced notches positioned along the edge so that the line defined by each notch and another notch on the opposite side of the inner blade cutting edge will cross the cutting edge substantially normal to its peripheral line at one of said notches.

8. The die described in claim 7 further characterized by having at least three notches located in the ball portion of said inner blade cutting edge, a pair of notches in the shank portion of said inner blade cutting edge and a pair of notches in the heel portion of said inner blade cutting edge.

References Cited by the Examiner

UNITED STATES PATENTS

| | | | |
|---|---|---|---|
| 1,492,607 | 5/1924 | Rosenwasser | 83—656 |
| 2,118,889 | 5/1938 | Lyness | 83—695 X |
| 2,165,394 | 7/1939 | Lyness | 83—659 X |

WILLIAM W. DYER, JR., *Primary Examiner.*